FUEL PREMIXING FOR SMOKELESS JET ENGINE MAIN BURNER
Original Filed June 19, 1968 
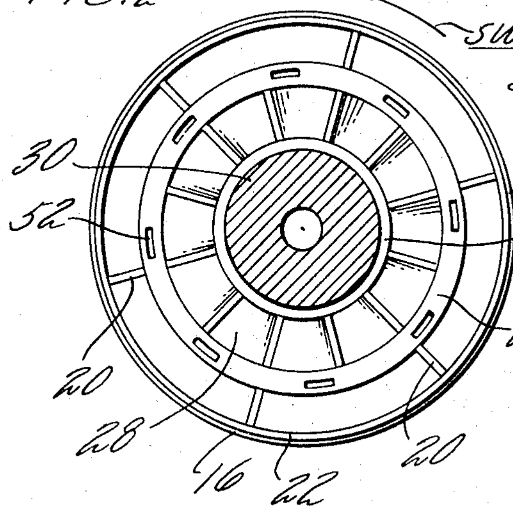
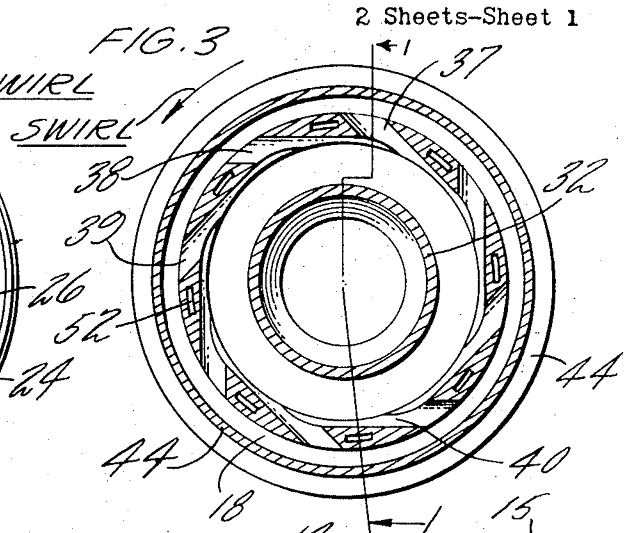
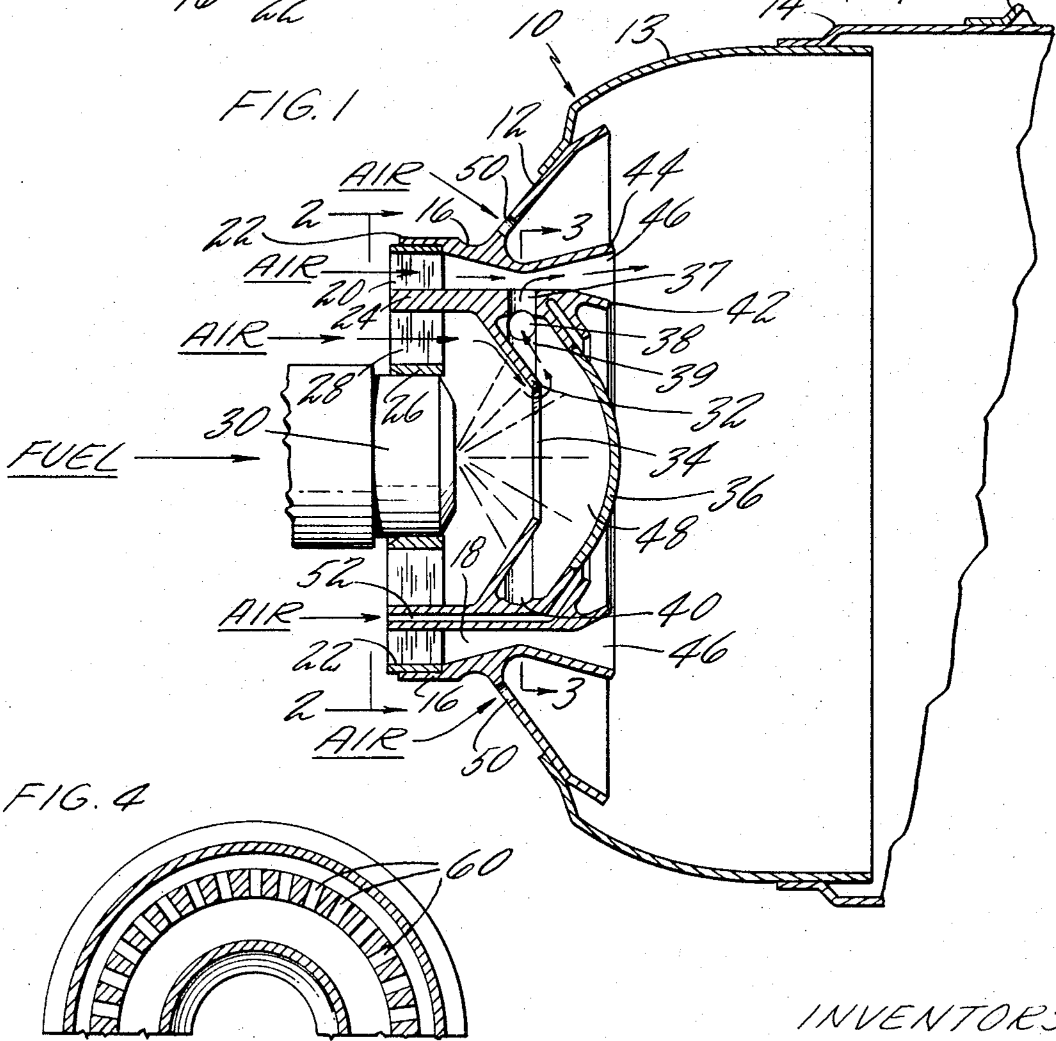
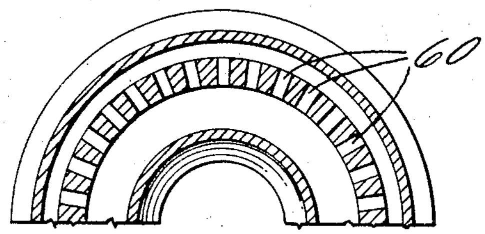
INVENTORS
SALVATORE A. LEONARDI
ROBERT A. RUBINO
BY Melvin Pearson Williams
ATTORNEY FUEL PREMIXING FOR SMOKELESS JET ENGINE MAIN BURNER
Original Filed June 19, 1968
2 Sheets-Sheet 2
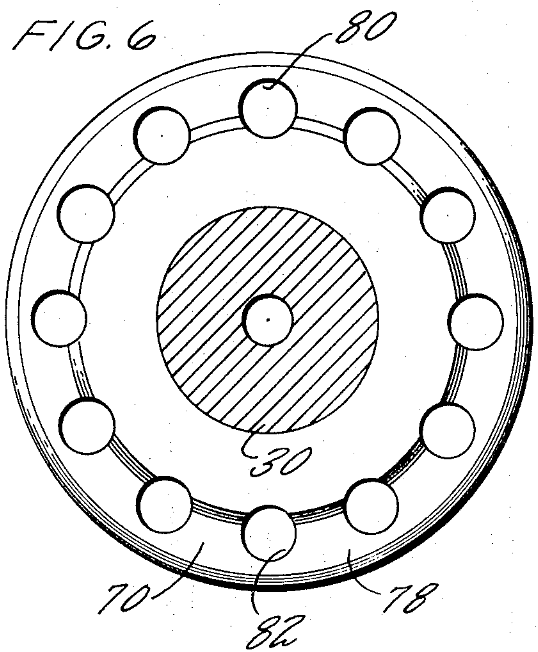
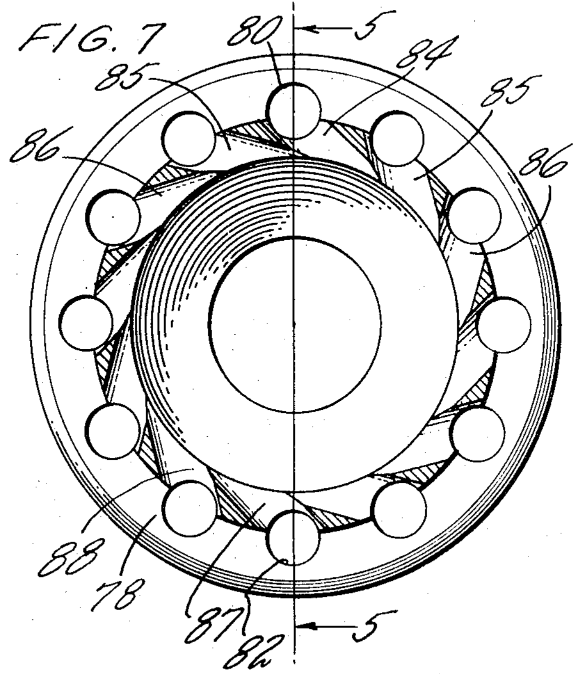
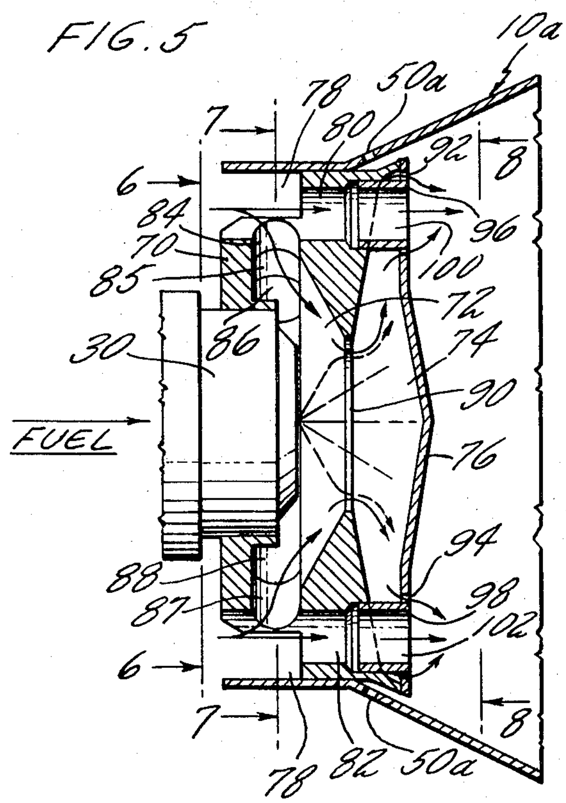
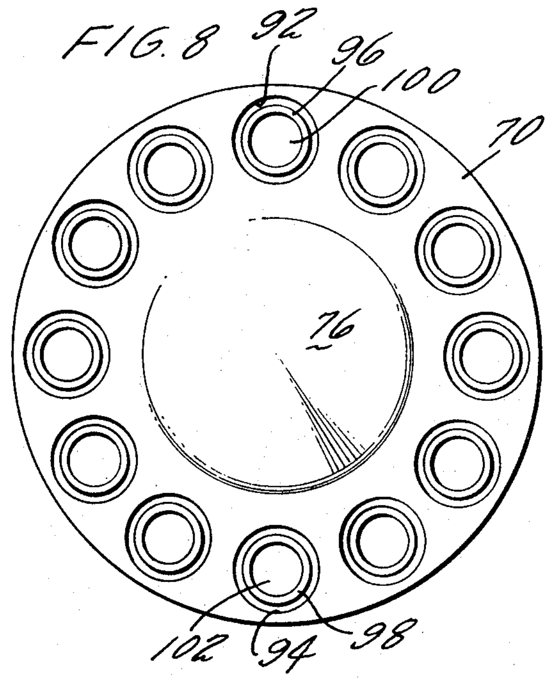
INVENTORS
SALVATORE A. LEONARDI
ROBERT A. RUBINO
BY Melvin Pearson Williams
ATTORNEY United States Patent Office 3,570,242

Patented Mar. 16, 1971

3,570,242

FUEL PREMIXING FOR SMOKELESS JET ENGINE MAIN BURNER

Salvatore A. Leonardi, Rockville, and Robert A. Rubino, West Willington, Conn., assignors to United Aircraft Corporation, East Hartford, Conn.

Continuation of application Ser. No. 738,216, June 19, 1968, which is a continuation-in-part of application Ser. No. 710,538, Mar. 5, 1968. This application Apr. 20, 1970, Ser. No. 28,252

Int. Cl. F02c *7/22*

U.S. Cl. 60—39.74 5 Claims

ABSTRACT OF THE DISCLOSURE

Air is swirled into a frusto-conical converging annular baffle within a chamber, which causes increased rotary velocity of the swirling air; fuel is sprayed into the air within the chamber. When the swirled fuel-air mixture passes through the axial outlet of the converging baffle, it is centrifugally forced radially outward through tangential or radial ports into the throat of an annular venturi duct through which further air is introduced. This mixture then enters the burner can of a gas turbine for combustion. Additional air passages may be used so as to prevent carbon formation on various surfaces.

The invention herein described was made in the course of a contract with the Department of the Navy.

This is a continuation of application Ser. No. 738,216, filed June 19, 1968, now abandoned, which was a continuation-in-part of our application Ser. No. 710,538, filed on Mar. 5, 1968 now abandoned.

BACKGROUND OF THE INVENTION

Field of invention

This invention relates to gas turbines and more particularly to fuel premixing apparatus.

Description of the prior art

As is known in the art, premixing fuel with air prior to entry into a combustion chamber (or burner can) reduces the amount of carbon and smoke formation as a result of the combustion process. Also known is the use of a swirler passage having stationary angular vanes to provide a revolving motion to the air which is mixed with the spray of fuel. These known expedients reduce the generation of smoke and formation of carbon deposits. However, there is still a need for vast improvement in the character of the combustion within gas turbines.

SUMMARY OF THE INVENTION

The object of the present invention is to reduce the smoke and carbon deposits formed in the combustion of fuel within the main burner of a gas turbine.

According to the present invention, premix air is forced against a converging hollow frustrum baffle as it mixes with a spray of fuel so that upon clearing the baffle it is accelerated radially outward into the main burner inlet air stream. In accordance further with the invention, the premixed mixture passes through tangential or radial ports into the throat of an annular venturi air inlet duct for mixing with further air as it enters the burner can or combustion chamber of a gas turbine.

In further accord with the present invention, ports may be provided to maintain a flow of air across the surfaces of a burner can to reduce the formation of carbon deposits thereon.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 1 is a sectioned, partial side elevation of a premixing fuel/air inlet to the burner of a gas turbine, in accordance with the present invention;

FIG. 2 is a section taken on the line 2—2 of the embodiment of FIG. 1;

FIG. 3 is a section taken on the line 3—3 in the embodiment of FIG. 1;

FIG. 4 is a section illustrating an alternative form of ports which are radial in contrast with the tangential ports of FIGS. 1–3;

FIG. 5 is a sectioned, partial side elevation of another embodiment of premixing fuel air inlet in accordance with the present invention;

FIG. 6 is a section taken on the line 6—6 in the embodiment of FIG. 5;

FIG. 7 is a section taken on the line 7—7 in the embodiment of FIG. 5; and

FIG. 8 is a section taken on the line 8—8 in FIG. 5.

DESCRIPTION OF THE PREFERRED EMBODIMENTS

Referring now to FIGS. 1–3, a burner can 10 is comprised of a plurality of annular sections 12–15, etc., as is known in the art. An annular section 16 is fitted to the foremost section 12 of the burner can 10 and provides the radially outward wall of an annular venturi air inlet passage 18. The air inlet passage 18 is fitted with a plurality of vanes 20 disposed between an annular ring 22 and an annular baffle assembly 24. Between the baffle assembly 24 and an additional annular ring 26 are disposed a set of swirler vanes 28. The components 24–28 form a swirler passage for the intake of premixing air. Into the ring 26 is disposed a fuel nozzle 30 which may be of any suitable type known in the art. The baffle assembly 24 includes a frusto-conical converging baffle 32 which has an axial opening 34 therein and a dome-shaped closed baffle 36, which forms a chamber 48. In the peripheral wall of the baffle assembly 24, between the baffles 32 and 36, are a plurality of tangential or radial fuel mixture ports 37–40, etc., which passes the premixed fuel/air mixture into the main stream of air within the inlet passage 18. The baffle assembly 24 includes a diverging portion 42 and the annular section 16 includes a diverging portion 44 so as to form an annular diverging nozzle 46. The diverging nozzle 46 permits a greater spreading of the fuel/air mixture in the burner chamber and also tends to atomize this mixture.

In operation, air is forced through the swirler passage (28) and against the frusto-conical converging baffle 32 which forces the air inwardly towards the passage 34 in the baffle 32. Because the air is swirling (due to the swirler vanes 28), its rotational velocity increases as it progresses along the frusto-conical converging baffle 32. During this time, a substantial portion of the fuel from the nozzle 30 which is sprayed into the chamber 48 mixes with the air. As the fuel/air mixture clears the passage 34, its high rotational velocity causes it to be forced radially outward as a result of centrifugal force so that this mixture passes through the ports 37–40, etc., into the annular inlet passage 18 for mixture with additional air which may be swirled or not, as is desired. That is, the vanes 20 might be angled so as to provide swirling of the air as it enters the passage 18, or they may merely be struts providing physical support to the annular baffle assembly 24. The passage 18 need not be of a venturi configuration; the invention may be practiced in a variety of configurations. In either case, the premixed fuel/air mixture passing through the passages 37–40, etc., as a result of centrifugal force will mix with more air in the passage 18, and be injected through the annular nozzle 46 into the burner can 10 for combustion.

In accordance with one object of the present invention, the formation of carbon deposits on various surfaces within the burner can may be reduced by providing passages which force air over the surfaces. Specifically, a plurality of passages 50 may be provided to permit air to flow into the burner can directly against the annular baffle 44. Also, a plurality of passages 52 may be provided through the annular baffle assembly 24 so as to direct a flow of air along the burner side of the dome-shaped baffle 36. Other suitable passages, of course, may be provided in any given embodiment of the present invention.

The ports 37–40 (FIGS. 2 and 3) may be radial, instead of tangential, as illustrated by the ports 60 in FIG. 4. Other suitable angles may be chosen, and the size and number may vary to suit any detailed design parameters.

Referring now to FIGS. 5–8 another embodiment of the present invention includes an annular baffle assembly 70 which is cast so as to provide a frusto-conical, open ended converging surface 72 which opens into a sub-chamber 74 formed by a suitably disposed baffle 76. Air enters the assembly through a main annular air inlet passage 78, after which it is divided between main burner can air which flows through a plurality of main burner air inlet passages 80, 82 etc., and premix air which flows through a plurality of tangential air passages 84–88, etc. The premix air is mixed with fuel sprayed from a nozzle 30, after which it flows through an opening 90 in the converging wall 72, into the sub-chamber 74, and then outwardly through a plurality of annular passages 92, 94 etc., formed by the insertion of cylindrical sleeves 96, 98 etc., which have axial passages 100, 102 therein that are of approximately the same size and aligned with the passages 80, 82 etc.

As is true of the embodiment of FIGS. 1–3, the air inlet passage 78 may include swirler vanes to assist in establishing rotational motion of the premixing air, or the rotational motion may be provided solely by the tangential passages 84–88. In either event, centrifugal force causes the movement of the premixed fuel/air mixture within the chamber 74 outwardly to the annular passages 92, 94 etc. The burner can 10*a* may be provided with air inlet holes 50*a* (as in the embodiment of FIGS. 1–3) so as to avoid carbon formation on the surfaces of the premixer and of the burner can.

Although the invention has been shown and described with respect to preferred embodiments thereof, it should be understood by those skilled in the art that various changes and omissions in the form and detail thereof may be made therein without departing from the spirit and the scope of the invention.

Having thus described a typical embodiment of our invention, what we claim as new and desire to secure by Letters Patent of the United States is:

1. In a gas turbine having a burner adapted to be disposed in a surrounding air duct, said burner having an upstream end with at least one fuel mixing assembly positioned therein, said assembly comprising:

- a fuel nozzle having a downstream face with a spray opening substantially centrally thereof adapted to discharge a spray of fuel in a downstream direction; and
- a support structure carried by the upstream end of the burner and having a central opening to receive the nozzle;

said support structure including:

- annular means downstream of the nozzle face defining a concave frusto-conical surface spaced from and facing said nozzle downstream face;
- swirl inlet means surrounding said nozzle to admit premix air to the space between said nozzle downstream face and said frustoconical surface and to impart a swirl to the premix air as it enters said space, the swirling premix air mixing with a substantial portion of the spray of fuel in said space to form a fuel-air mixture, said frustoconical surface having a central opening for the discharge of the fuel-air mixture therethrough;
- baffle means disposed downstream of said frustoconical surface defining a chamber downstream of said central opening, said baffle means being substantially impervious over a central area downstream of and larger than said central opening and directing the swirling fuel-air mixture from said opening in a generally radially outward direction;
- axially extending passage means around the periphery of said baffle means for introducing primary air to the upstream end of the burner; and
- chamber outlet passage means at the periphery of the baffle means for directing the radially flowing fuel-air mixture out of said chamber and into mixing relation with the primary air entering the burner.

2. The invention according to claim 1 wherein said axially extending primary air passage means is annular and wherein said swirl inlet means comprises an annular inlet passage having swirler vanes therein, said swirl inlet means being coaxially disposed within said primary air passage means.

3. The invention according to claim 1 wherein said axially extending primary air passage means is annular, and wherein said chamber outlet passage means comprises a plurality of ports disposed tangentially, in the same direction as the direction of flow established by said swirl inlet means, between said chamber and said primary air passage means.

4. The invention according to claim 1 wherein said axially extending primary air passage means is annular and wherein said swirl inlet means comprises passages, between said primary air passage means and said space, disposed tangentially with respect to said primary air passage means.

5. The invention according to claim 1 wherein said axially extending primary air passage means comprises a plurality of axial ports leading to a combustion area within the burner, said axial ports including cylindrical sleeves passing through said baffle means and into said burner combustion area, said sleeves each having an outside diameter smaller than the diameter of said axial ports, and wherein said chamber outlet passage means comprises the differential annular area surrounding each of said cylindrical sleeves.

References Cited

UNITED STATES PATENTS

| | | | |
|---|---|---|---|
| 3,285,007 | 11/1966 | Carlisle | 60—39.74 |
| 3,430,443 | 3/1969 | Richardson | 60—39.74 |

FOREIGN PATENTS

| | | | |
|---|---|---|---|
| 1,130,578 | 10/1956 | France | 60—39.72 |

DOUGLAS HART, Primary Examiner

U.S. Cl. X.R.

431—183, 354